United States Patent
Lynch et al.

(10) Patent No.: US 6,345,232 B1
(45) Date of Patent: Feb. 5, 2002

(54) DETERMINING AIRCRAFT POSITION AND ATTITUDE USING GPS POSITION DATA

(76) Inventors: Urban H. D. Lynch, 7926 Berner St., Long Beach, CA (US) 90808; Robert C. Ettinger, 2212 via Pacheco, Palos Verdes Estates, CA (US) 90274

(*) Notice: Subject to any disclaimer, the term of this patent is extended or adjusted under 35 U.S.C. 154(b) by 0 days.

(21) Appl. No.: 09/300,635

(22) Filed: Apr. 27, 1999

Related U.S. Application Data

(63) Continuation of application No. 08/833,830, filed on Apr. 10, 1997, now abandoned.

(51) Int. Cl.[7] .................................................. G01S 5/14
(52) U.S. Cl. .................... 701/214; 701/14; 342/357.12
(58) Field of Search ................................. 701/213, 214, 701/14; 342/357.06, 357.12

(56) References Cited

U.S. PATENT DOCUMENTS

| | | |
|---|---|---|
| 3,945,593 A | 3/1976 | Schanzer |
| 4,046,341 A | 9/1977 | Quinlivan |
| 4,442,491 A | 4/1984 | Olhausen, Jr. |
| 4,729,737 A | 3/1988 | Reagan et al. |
| 5,228,854 A | 7/1993 | Eldridge |
| 5,240,416 A | 8/1993 | Bennington |
| 5,325,302 A | 6/1994 | Izidon et al. |
| 5,382,958 A | 1/1995 | FitzGerald |
| 5,566,073 A | 10/1996 | Margolin |
| 5,571,018 A | 11/1996 | FitzGerald |
| 5,587,904 A | 12/1996 | Ben-Yair et al. |
| 5,596,332 A | 1/1997 | Coles et al. |
| 5,596,600 A * | 1/1997 | Dimos et al. ............... 375/206 |
| 5,651,676 A | 7/1997 | Artwick |
| 5,689,420 A * | 11/1997 | Brewster ..................... 701/14 |
| 5,702,323 A | 12/1997 | Poulton |
| 5,714,948 A | 2/1998 | Farmakis et al. |
| 5,732,385 A | 3/1998 | Nakayama et al. |
| 5,739,787 A | 4/1998 | Burke et al. |
| 5,748,109 A | 5/1998 | Kosaka et al. |
| 5,751,609 A | 5/1998 | Schaefer, Jr. et al. |
| 5,781,437 A | 7/1998 | Wiemer et al. |
| 5,787,333 A | 7/1998 | Rasinski et al. |
| 5,867,411 A * | 2/1999 | Kumar ....................... 375/232 |

* cited by examiner

*Primary Examiner*—Michael J. Zanelli
(74) *Attorney, Agent, or Firm*—Blakely, Sokoloff, Taylor & Zafman LLP

(57) ABSTRACT

The present invention is a method and apparatus to determine flight parameters of an aircraft. Data received from a global positioning system (GPS) receiver are converted to position data. The position data are filtered based on a least-squares fitting to generate smoothed position data which provide the flight parameters.

35 Claims, 11 Drawing Sheets

DETERMINING AIRCRAFT POSITION AND ATTITUDE USING GPS POSITION DATA

This application is a Continuation application Ser. No. 08/833,830 filed on Apr. 10, 1997, now abandoned, which is incorporated herein by reference.

BACKGROUND

1. Field of the Invention

This invention relates to aircraft data processing. In particular, the invention relates to data smoothing.

2. Description of Related Art

Military and commercial uses of the Global Positioning System (GPS) have become popular. The commercial use of the GPS for the location of objects has developed many applications to ship navigation, commercial and private aircraft navigation, car navigation, hiking, etc. Military uses of the GPS data are numerous. One military use of the GPS data in aircraft navigation is training air-combat pilots. The GPS data are used to record and playback the position and attitude (as recorded from the avionics systems in the aircraft) of each aircraft during complex air-to-air combat maneuvers.

However, the measurements of aircraft position and dynamic parameters using GPS data in these applications cases still have many problems. First, the GPS data as recorded are usually inaccurate. Typical GPS data have an error of a few hundred meters. This range of error is not acceptable for many data analysis tasks such as post-flight scenario reconstruction. Secondly, in aircraft with high maneuverability such as fighters, the recorded data are very noisy, resulting in inaccurate measurements of aircraft dynamic parameters.

Therefore there is a need in the technology to provide an accurate and efficient method to determine aircraft position and flight dynamic parameters, including attitude, using GPS data.

The present invention is a method and apparatus to determine flight parameters, including attitude, of an aircraft. Data received from a global positioning system (GPS) receiver are converted to position data. The position data are filtered based on a least-squares fitting to generate smoothed position data which provide the flight parameters.

BRIEF DESCRIPTION OF THE DRAWINGS

The features and advantages of the present invention will become apparent from the following detailed description of the present invention in which.

DESCRIPTION

The present invention is a method and apparatus to process global positioning system (GPS) data to determine aircraft position and dynamics. The technique performs least square smoothing of data over a number of smoothing intervals. The technique provides an accurate determination of aircraft position and dynamics.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
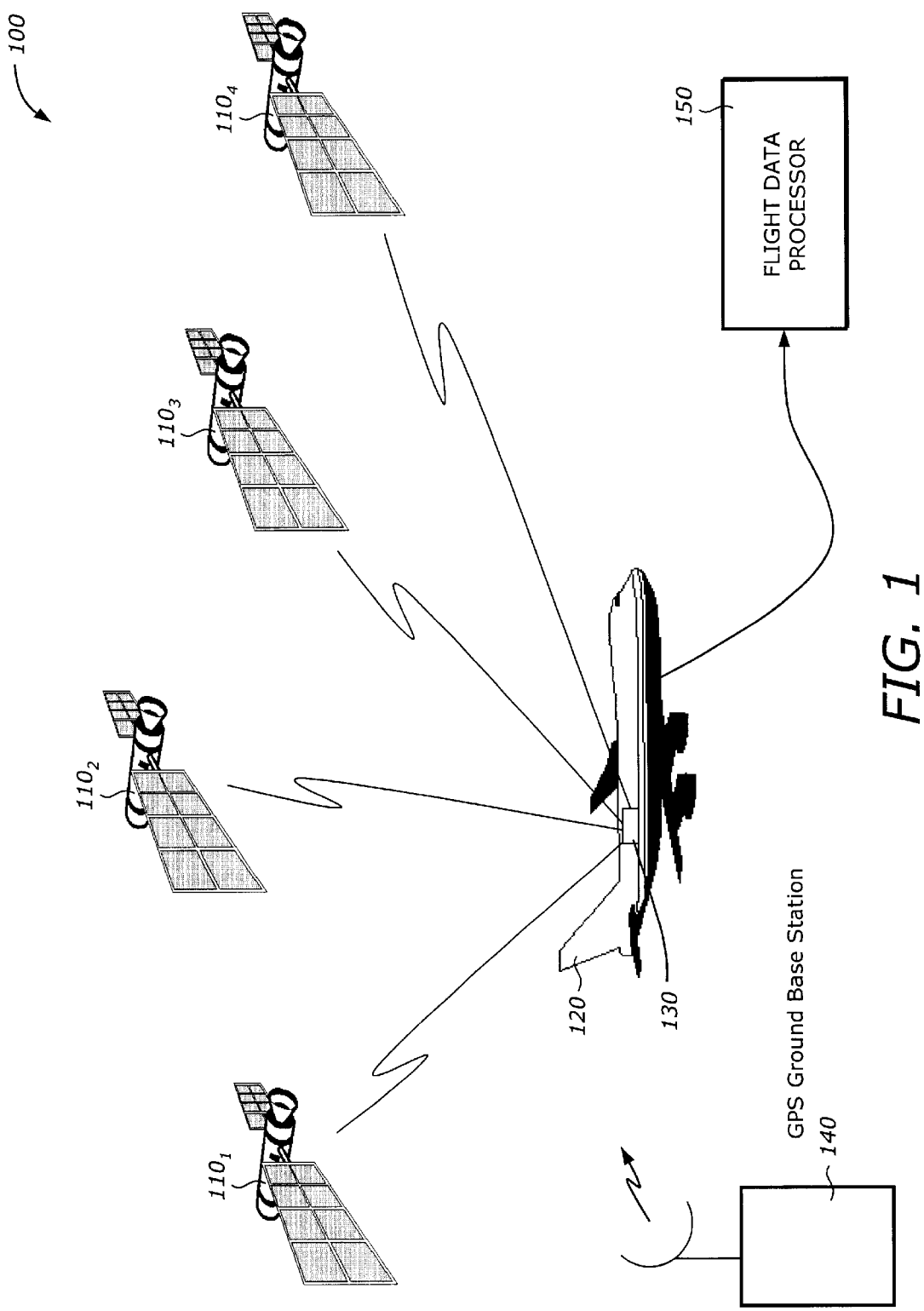
FIG. 1 is a diagram illustrating a system in which one embodiment of the invention can be practiced.

FIG. 1 is a diagram illustrating a system 100 in which one embodiment of the invention can be practiced. The system 100 includes four GPS satellites $110_1$, $110_2$, $110_3$, and $110_4$, an aircraft 120, a ground base station 140, and a flight data processing system 150.

The GPS satellites $110_1$, $110_2$, $110_3$, and $110_4$, together with the ground base station 140, transmits GPS data to the aircraft 120. The ground base station 140 provides reference signal to the GPS satellites 1101, 1102, 1103, and $110_4$. Alternatively, the reference signal can be provided by another satellite. The aircraft 120 includes an airborne module 130 that provides navigation data. The airborne module 130 includes a GPS receiver and antenna, operating to receive the GPS signals from the GPS satellites $110_1$, $110_2$, $110_3$, and $110_4$. The module 130 also includes a flight recorder which records the flight data as provided by the GPS satellites $110_1$, $110_2$, $110_3$, and $110_4$.

The flight data processing system 150 is typically a ground-based system that processes the flight data as recorded by the module 130.

Figure 2A:
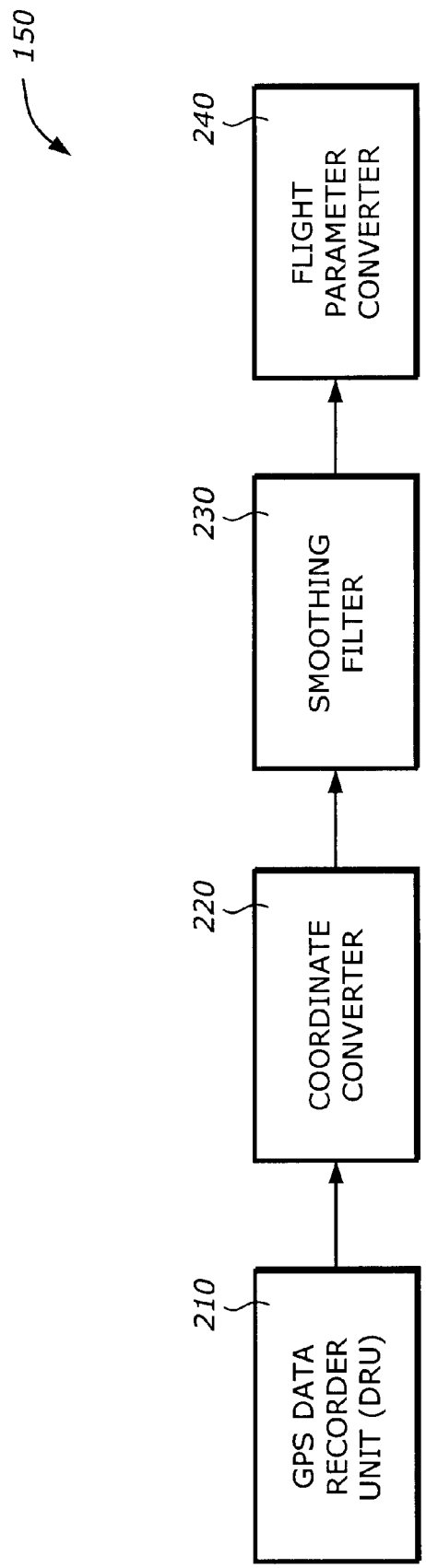
FIG. 2A is a diagram illustrating one embodiment of a flight data processing system.

FIG. 2A is a diagram illustrating one embodiment of a flight data processing system 150. The system 150 includes a GPS data recording unit (DRU) 210, a coordinate converter 220, a smoothing filter 230, and a dynamic parameter converter 240.

The GPS DRU 210 records the GPS raw data as received from the GPS receivers installed in the aircraft. The GPS raw data includes longitude, latitude, and altitude information of the aircraft. The GPS raw data are inherently noisy with poor accuracy. Commercial GPS position data are typically accurate to 100 meters, which may result in poor measurements of aircraft dynamics and position.

The coordinate converter 220 reads the data files from the GPS DRU 210 and converts the raw GPS data to xyz data using a predetermined earth referenced xyz-coordinate system. The xyz data are determined based on the three-dimensional Cartesian coordinate system. The conversion of GPS data (latitude, longitude, and altitude) to the xyz position data is well known.

The smoothing filter 230 receives the xyz data from the coordinate converter 220 and smoothes the xyz position data to produce smoothed xyz position data.

The flight parameter converter 240 converts the smoothed xyz data to the flight dynamic parameters. The flight dynamic parameters include the velocity, acceleration, yaw, pitch, roll angles of the aircraft.

Figure 2B:
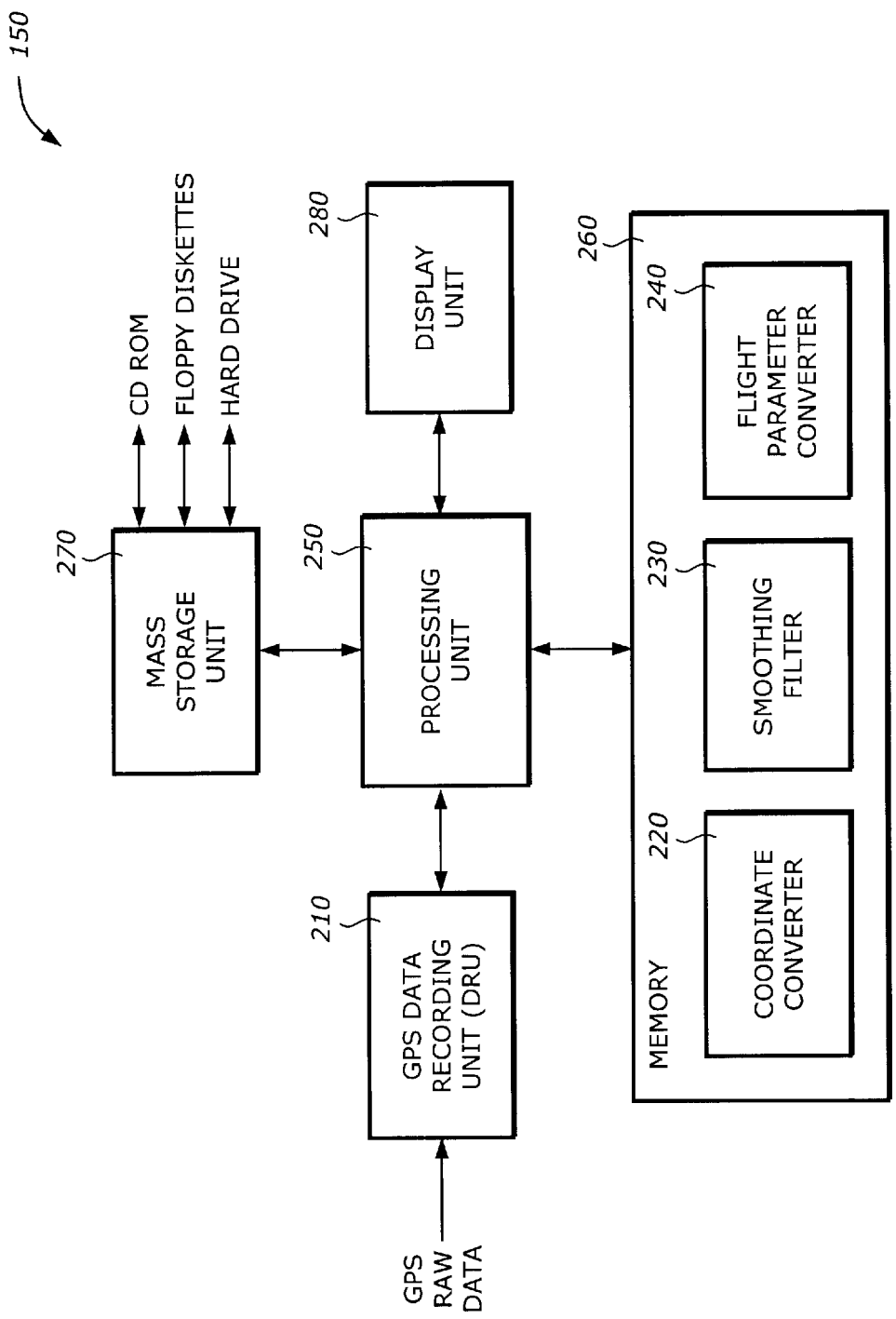
FIG. 2B is a diagram illustrating another embodiment of a flight data processing system.

FIG. 2B is a diagram illustrating another embodiment of a flight data processing system 150. The system 150 includes the GPS DRU 210, a processing unit 250, a memory 260, a mass storage unit 270, and a display unit 280.

The processing unit 250 is any processor which can execute programs to process information. In one embodiment is the processor unit 250 is an Intel Pentium II processor configured in a lap-top or notebook housing. The memory 260 stores program code and data for use by the processing unit 250. The memory 260 may be implemented as a random access memory (RAM, either dynamic or static), read only memory (ROM), or nonvolatile flash memory. The memory 260 includes the coordinate converter 220, the smoothing filter 230, and the flight parameter converter 240. The smoothing filter 230 may be implemented by hardware or software. In one embodiment, the smoothing filter 230 includes program code segments that execute instructions from the processing unit 250. When implemented in software, the elements of the smoothing filter 230 are essentially the code segments to perform smoothing of GPS data. The program or code segments can be stored in a processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc.

The mass storage unit 270 includes any mass storage device that can store information on a non-volatile manner. The mass storage unit 270 interfaces to a number of mass storage media such as CDROM, floppy diskettes, and hard disk, etc. These mass storage media are also the processor readable media storing the program code segments for the coordinate converter 220, the smoothing filter 230, and the flight parameter converter 240.

The display unit 280 displays the results of the data analysis. In post-flight data analysis, examples of the results include the reconstructed flight path. The reconstructed flight path is plotted and displayed on the display unit 280 based on the data provided by the processing unit 250.

Figure 3:
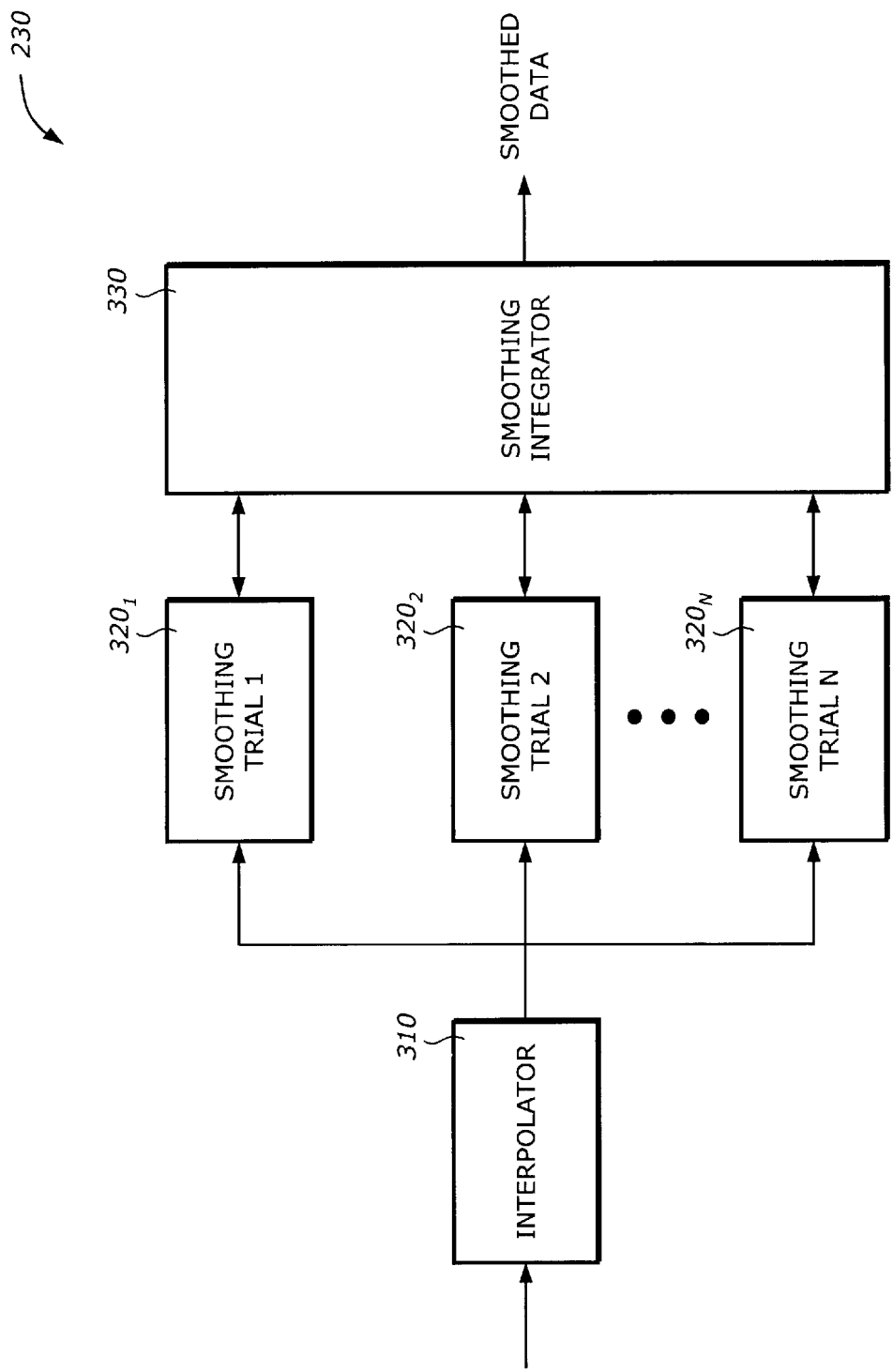
FIG. 3 is a diagram illustrating a smoothing filter according to one embodiment of the invention.

FIG. 3 is a diagram illustrating a smoothing filter 230 according to one embodiment of the invention. The smoothing filter 230 includes an interpolator 310, a bank of M smoothing processors $320_1$ to $320_M$, and a smoothing integrator 330.

The interpolator 310 interpolates the xyz position data from the coordinate converter 220 shown in FIG. 2. Depending on the coordinate data, the interpolation may be quadratic or linear, or even optional. In one embodiment, a linear interpolation is used. For aircraft with high turn rates such as fighter, the interpolation is necessary to provide more data for smoothing. Typically, high fighter turn rates allow about seven or eight one-hertz raw xyz position data points in a 180-degree turn of trajectory. A linear interpolation of these data points provide an additional set of seven or eight data points which are sufficient for a reliable smoothing process. When interpolation is optional, the xyz position data are bypassed and go directly to the bank of smoothing processors $320_1$ to $320_M$.

The linear interpolation is computed using the following equations:

$$x=(x_1+x_2)/2 \tag{1a}$$
$$y=(y_1+y_2)/2 \tag{1b}$$
$$z=(z_1+z_2)/2 \tag{1c}$$

where $(x_1, y_1, z_1)$ and $(x_2, y_2, z_2)$ are two consecutive xyz data points at time $t=t_1$, and $t=t_2$.

The bank of M smoothing processors $320_1$ to $320_M$ smooth the interpolated data in a time interval window W. The time interval window W may be constant through out the smoothing process or may be variable according to the aircraft dynamics as determined by the previous results of the smoothing filter 230. Each of the sequential smoothing processor corresponds to a smoothing trial as will be explained later. In one embodiment, the time interval window W is fixed over the smoothing process with a predetermined minimum number of xyz position data points. The size of window W is selectable according to the maneuvering capabilities of the aircraft such that there will be sufficient data points.

The bank of smoothing processors $320_1$ to $320_M$ may operate in parallel or in series. In a parallel implementation, the data for each time interval window are provided to each of the smoothing processors $320_1$ to $320_M$ at the same time. In a sequential implementation, the smoothing processors $320_1$ to $320_M$ are arranged in series, such that one processor processes the data as generated by the previous processor. Each of the smoothing processors $320_1$ to $320_M$ operate at a different starting time, but with the same time interval window W. In one embodiment, the starting times of the smoothing processors $320_1$ to $320_M$ differ by one time step.

The smoothing integrator 330 operates together with smoothing processors $320_1$ to $320_M$ to provide the final smoothed data. In a parallel implementation, the smoothing integrator 330 selects the appropriate smoothed data at each smoothing interval window from the corresponding smoothing processors. In the sequential implementation, the smoothing integrator 330 selects the appropriate last result of the smoothing processor that is the last one in the desired processing chain.

Each of the smoothing processors $320_1$ to $320_M$ performs smoothing using a least-squares, $K^{th}$ order in time-fit to the xyz position data over the time interval window W. In one embodiment, the least-squares curve fitting is a second order curve. As is known by one skilled in the art, other orders of the curve fitting can be used. The selected xyz position data points are equally spaced in time.

Let $r_j$ be the xyz data at point j over the time interval W, $r_j$ can be any one of the x, y, or z data. Let $\underline{r}_j$ be the smoothed $r_j$. Let t be the time variable. Let N be the total number of data points in the time interval window W. The second order time-fit curve for the position variable $r_j$ over the time interval window W is determined by the following equation:

$$\underline{r}_j = A+Bt+Ct^2 \tag{2}$$

where A, B, and C are the smoothing constants for the time interval window W.

The first and second derivatives of the $\underline{r}_j$ position variable are:

$$\underline{r}_j' = d\underline{r}_j/dt = B+2Ct \tag{3}$$
$$\underline{r}_j'' = d^2\underline{r}_j/dt^2 = 2C \tag{4}$$

The first derivative is used to determine the velocity vector and the second derivative is used to determine the acceleration vector.

The equations to compute A, B, and C are given in the following:

$$A=\{P1*(a22*a33-a32*a23)+P2*(a13*a32-a12*a33)+P3*(a12*a23-a13*a22)\}/Q \quad (5a)$$

$$B=\{P1*(a31*a23-a21*a33)+P2*(a11*a33-a13*a31)+P3*(a13*a21-a11*a23)\}/Q \quad (5b)$$

$$C=\{P1*(a21*a32-a31*a22)+P2*(a12*a31-a11*a32)+P3*(a11*a22-a12*a21)\}/Q \quad (5c)$$

Where:

$$Q=a11*(a22*a33-a32*a32*a23)+a12*(a31*a23-a21*a33)+(a13*(a21*a32-a22*a31) \quad (6a)$$

$$P_1 = \Sigma r_i \quad (6b)$$

$$P_2 = \Sigma r_i * t_i \quad (6c)$$

$$P_3 = \Sigma r_i * t_i * t_i \quad (6d)$$

and:

$$a_{11}=N \quad (7a)$$

$$a_{21}=\Sigma t_i \quad (7b)$$

$$a_{31}=\Sigma t_i * t_i \quad (7c)$$

$$a_{12}=a_{21} \quad (7d)$$

$$a_{22}=a_{21} \quad (7e)$$

$$a_{32}=\Sigma t_i * t_i * t_i \quad (7f)$$

$$a_{13}=a_{31} \quad (7g)$$

$$a_{23}=a_{32} \quad (7h)$$

$$a_{33}=\Sigma t_i * t_i * t_i * t_i * t_i * \quad (7i)$$

where the summation is taken over the index i=1 to N. Furthermore, the time index $t_i$ for i=1, i.e., the first time index, corresponds to a zero value. To maintain adequate accuracy and prevent overflow/underflow, it is preferable that the above computations are performed using double-precision or extended precision arithmetics.

The linear-squares curve fitting smoothes a set of xyz data points over a time interval window W. Because the smoothing is performed on a window-by-window basis, there is a chance that there is a discontinuity between two successive time interval windows. To reduce or eliminate these continuities, the smoothing is performed in successive trials in the bank of smoothing processors $320_1$ to $320_M$. A smoothing trial refers to the smoothing as described above at a starting time $t=t_1$ where $t_1$ is shifted or translated by a time interval with respect to another smoothing trial.

Figure 4:
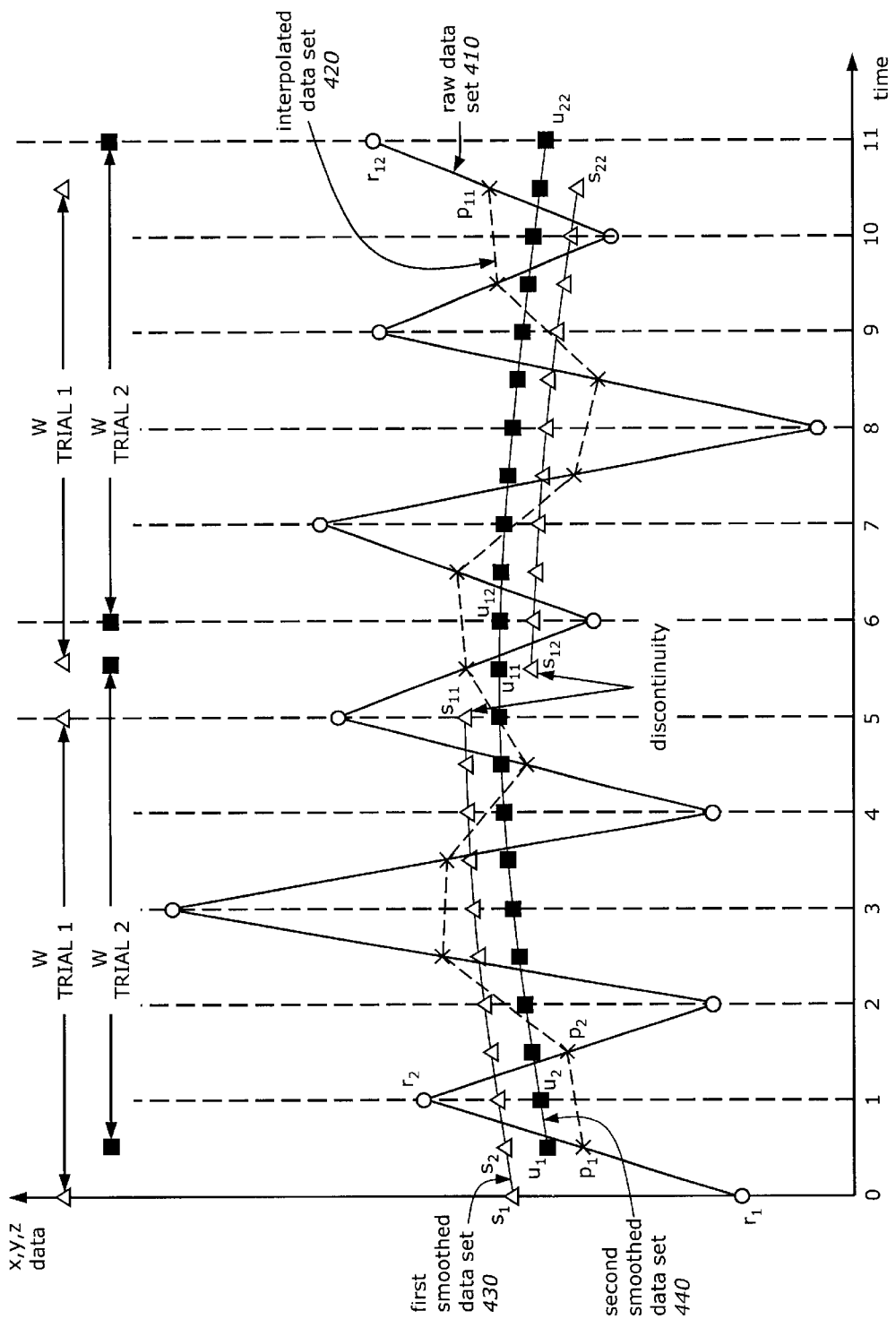
FIG. 4 is a diagram illustrating a set of smoothing data points according to one embodiment of the invention.

FIG. 4 is a diagram illustrating a set of smoothing data points according to one embodiment of the invention. The set of smoothing data points includes a raw data set 410, an interpolated data set 420, a first smoothed data set 430, and a second smoothed data set 440.

The vertical axis corresponds to the values of the xyz data. The horizontal axis corresponds to the time variable. In the example shown in FIG. 4, the time axis is equally spaced. The time interval window W corresponds to time interval of 5 time units. There are two trials, trial 1 and trial 2, each trial covering the same length of interval window W. Trial 1 starts from t=1 and trial 2 starts from t=0.5. Additional trials can be used if necessary.

The raw data set 410 includes the data points $r_1, r_2, r_3, \ldots, r_{12}$ having the circle symbol located at t=0, 1, 2, ..., 11, respectively. The interpolated data set 420 includes data points $p_1, p_2, \ldots p_{11}$, having the X symbol located at t=0.5, 1.5, ... 10.5, respectively. The first smoothed data set 430 includes the data points $S_1, S_2, S_3, \ldots, S_{22}$, having the triangle symbol located at t=0, 0.5, 1, 1.5, ..., 11, respectively. The first smoothed data set 430 includes two segments, each segment corresponds to a time interval window W. The first segment includes data points $s_1$ through $s_{11}$. The second segment includes data points $S_{12}$ through $S_{22}$. The second smoothed data set 440 includes the data points $u_1, u_2, u_3, \ldots, u_{22}$, having the filled square symbol located at t=0.5, 1, 1.5, ... 11, respectively. The second smoothed data set 440 includes two segments, each segment corresponds to a time interval window W. The first segment includes data points $u_1$ through $u_{11}$. The second segment includes data points $u_{12}$ through $u_{22}$.

Because the smoothing is performed on a window-by-window basis, the first smoothed data set 430 shows a discontinuity between the two segments at data points $s_{11}$ il and $S_{12}$. This discontinuity is eliminated by using the second smoothed data set 440. The smoothed data set 440 corresponds to the trial 2 having the smoothing interval window bridging the two consecutive windows of the first smoothed data set 430. In the sequential implementation, the smoothed data set 440 is the result of smoothing the first data set 430. In a sequential system where two trials are necessary, the second data set 430 becomes the final result. It is contemplated that additional smoothing will be necessary to produce satisfactory results.

Figure 5:
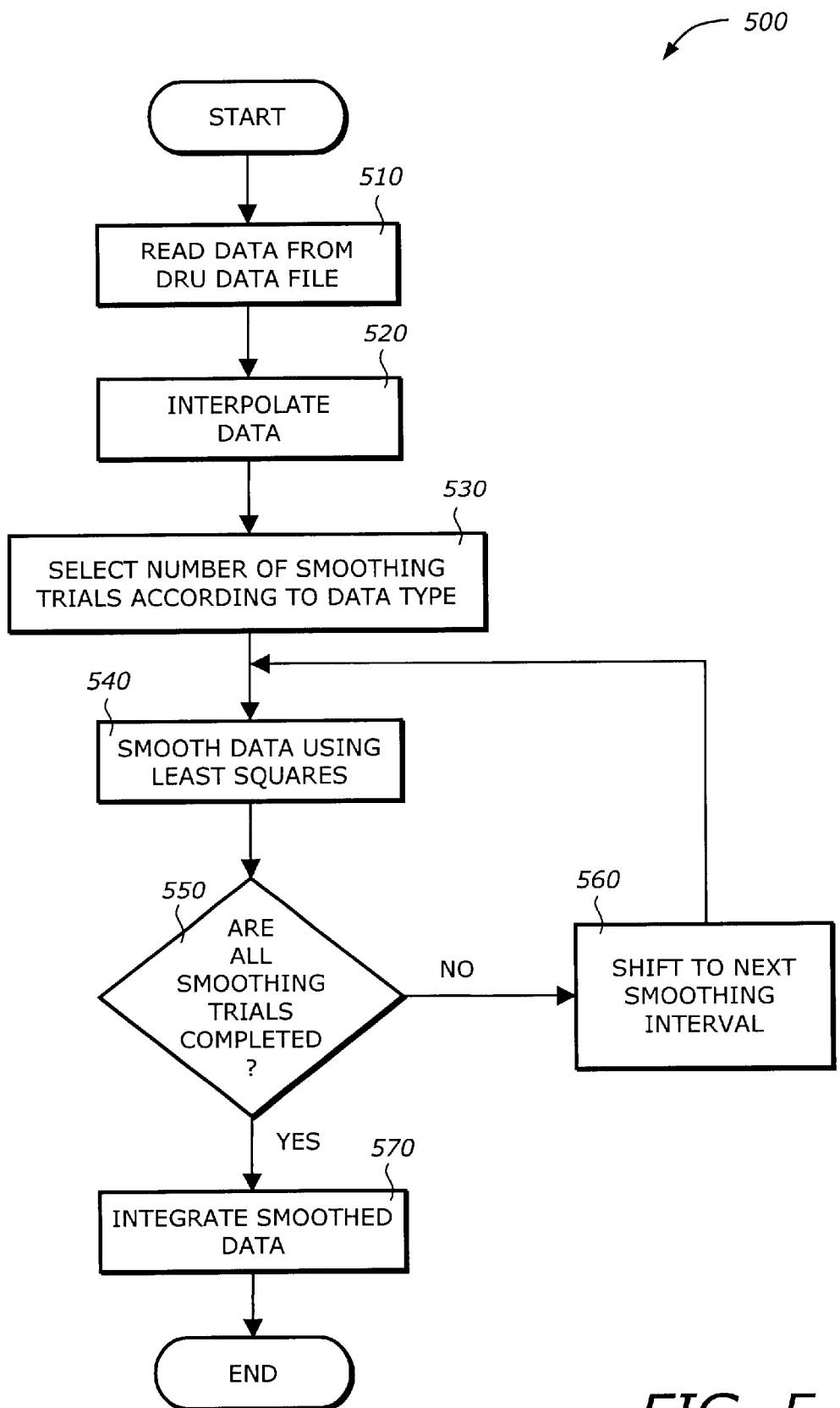
FIG. 5 is a flowchart illustrating a process to smooth data according to one embodiment of the invention.
Figure 6A:
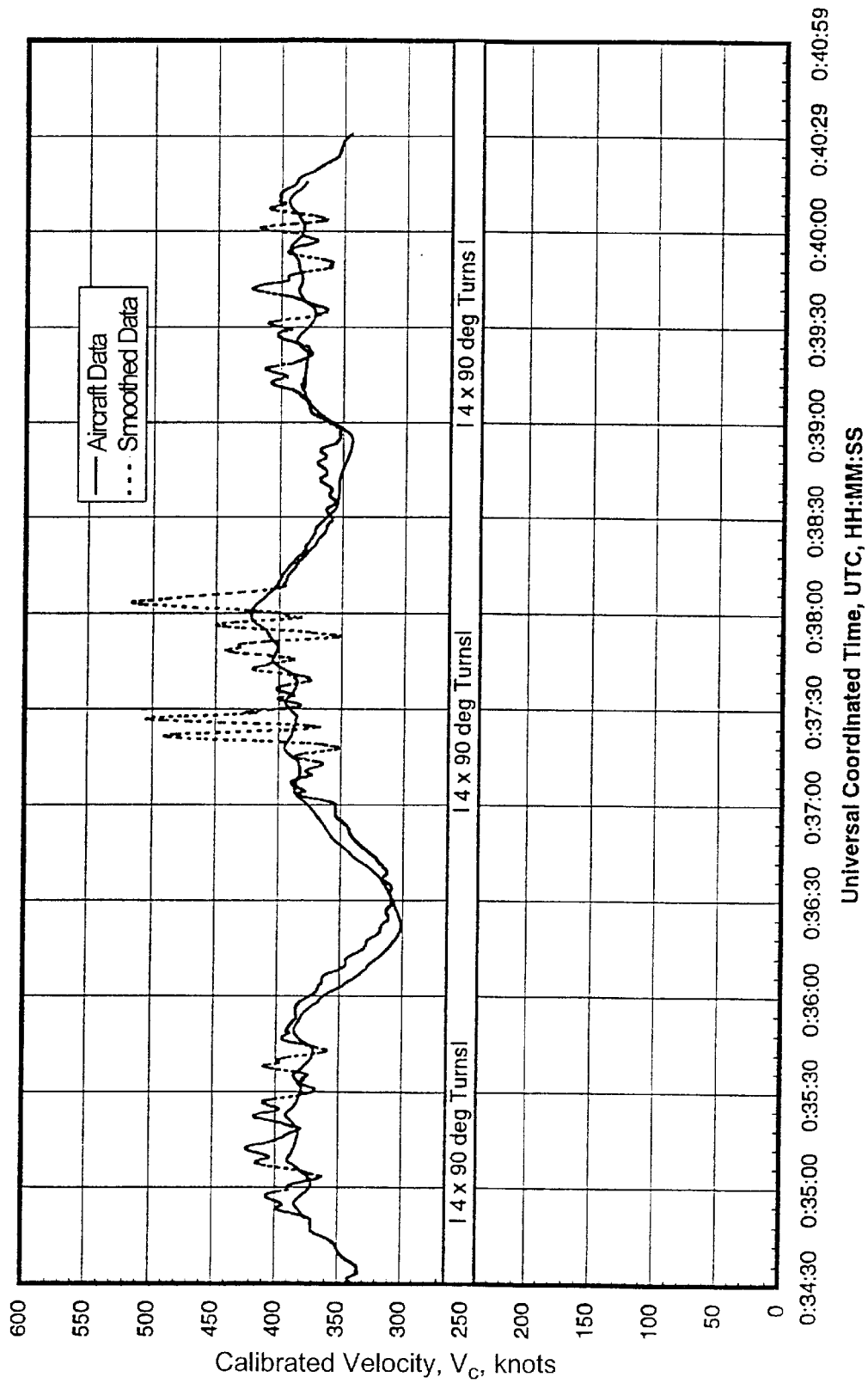
FIG. 6A shows the calibrated velocity as determined from the smoothed position data in a flight test.
Figure 6B:
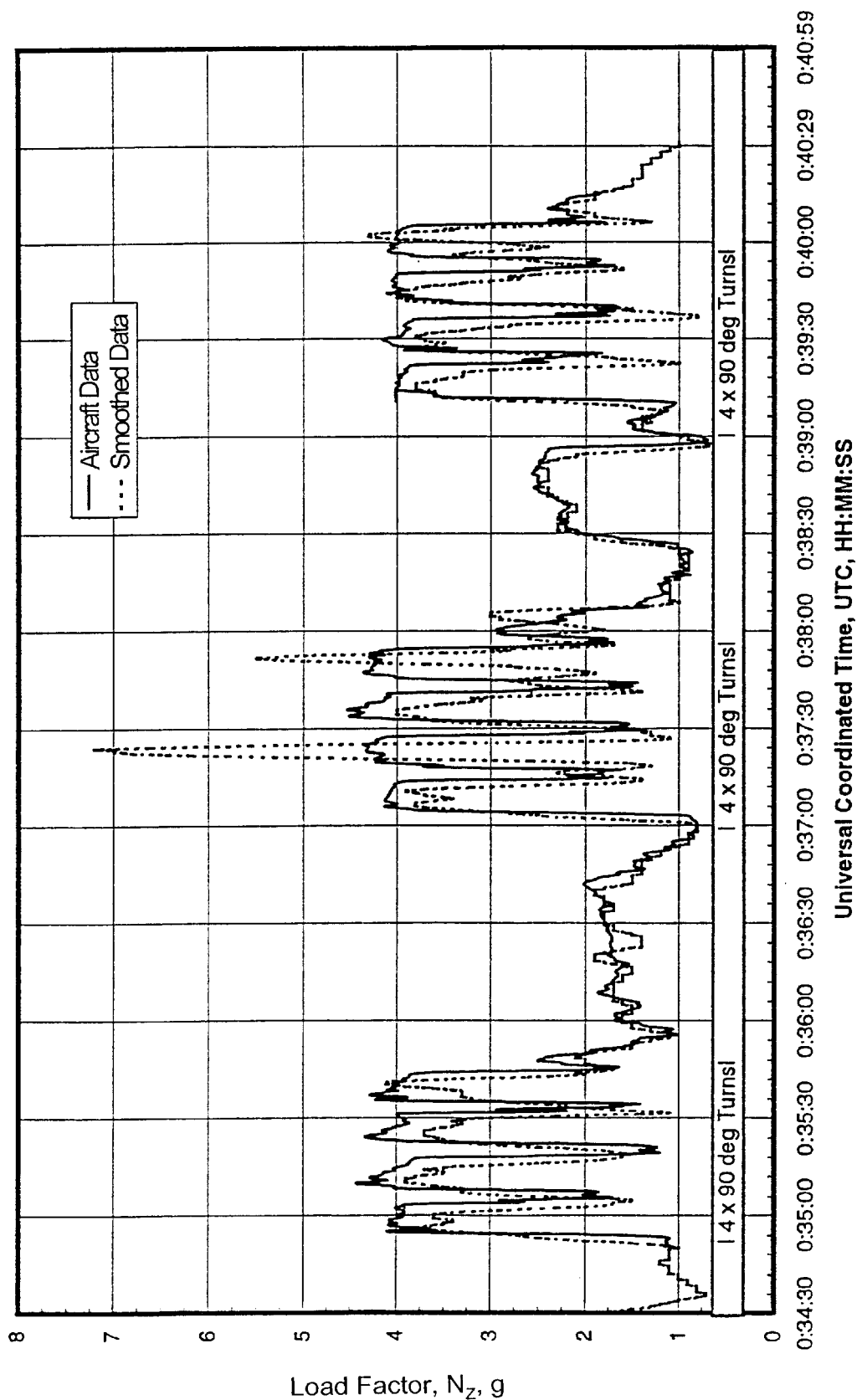
FIG. 6B shows the load factor as determined from the smoothed position data in a flight test.
Figure 6C:
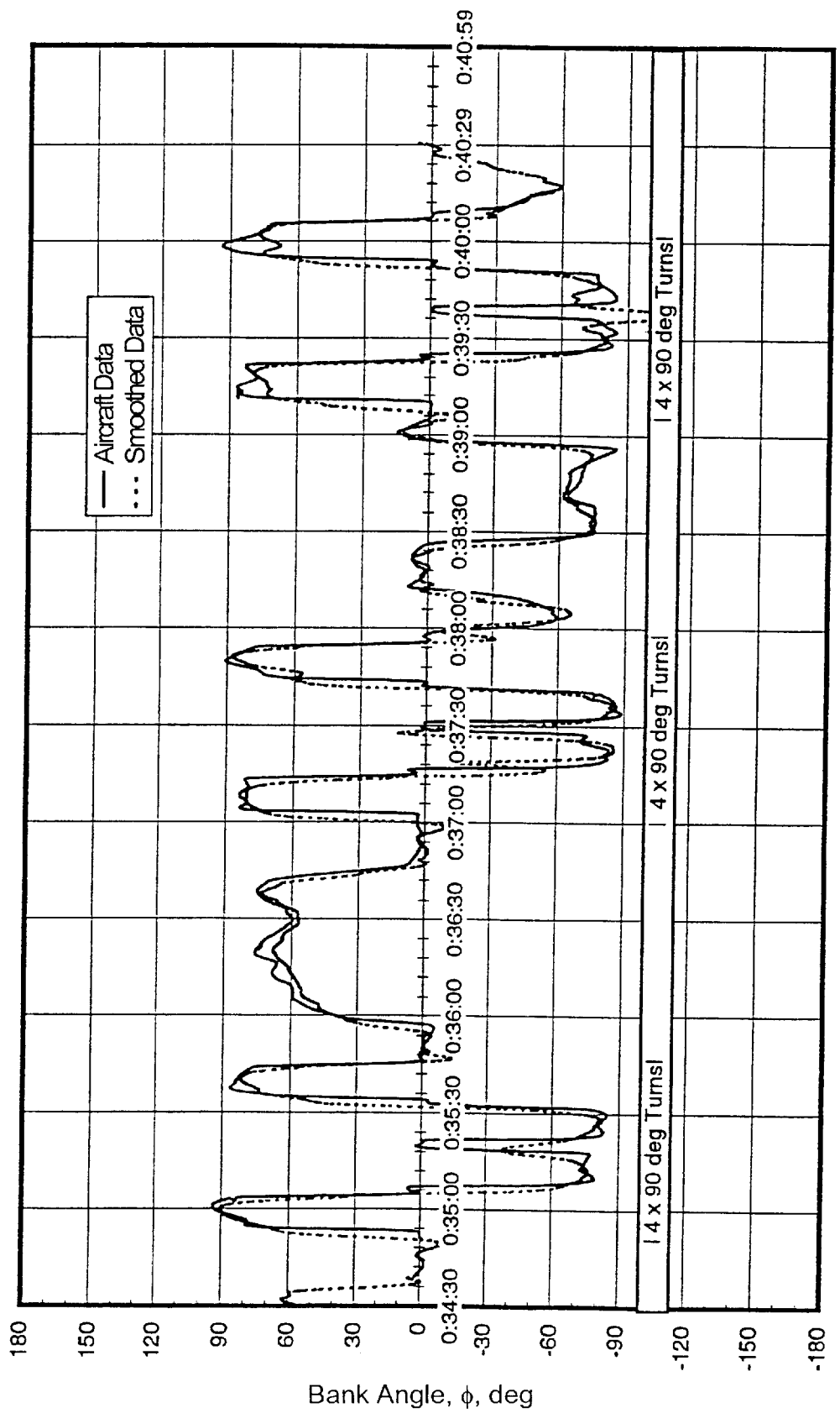
FIG. 6C shows the bank angle as determined from the smoothed position data in a flight test.
Figure 6D:
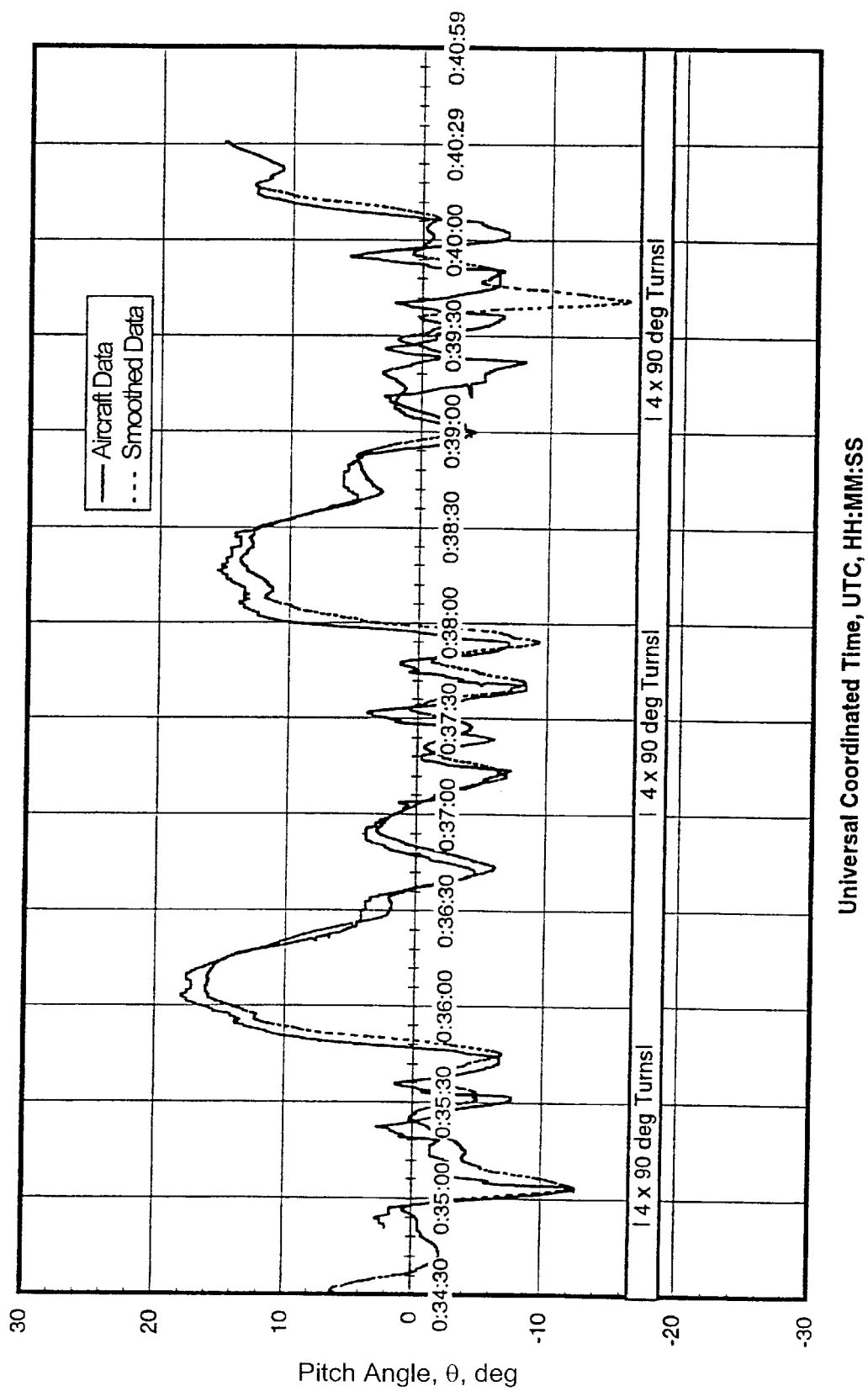
FIG. 6D shows the pitch angle as determined from the smoothed position data in a flight test.

FIG. 5 is a flowchart illustrating a process 500 to smooth data according to one embodiment of the invention.

Upon START, the process 500 reads the raw GPS data from the GPS DRU data files (Block 510). Then the process 500 interpolates the raw GPS data using a linear interpolation (Block 520). The process 500 selects the number of smoothing trials according to the data type (Block 530). Some data types may require more smoothing trials than others. For example, the z data typically requires twice the smoothing trials than the x and y data type.

Then the process 500 performs the least-squares curve fitting to smooth the data within the time interval window W (Block 540). Then the process 500 determines if all the smoothing trials have been completed (Block 550). If not, the process 500 goes to the next smoothing trial (Block 560) and return to block 540. Otherwise, the process 500 uses the equations (2), (3),and (4) to generate the final smoothed data (Block 570). For a sequential implementation, the determination of the smoothed data simply includes the selection of the last result in the appropriate chain of processing. The process 500 is then terminated.

FIGS. 6A, 6B, 6C, and 6D shows the calibrated velocity, the load factor, the bank angle, and the pitch angle as determined from the smoothed position data in a flight test. As shown in these figures, the results of the flight data processing match very closely to the aircraft data.

Figure 7:
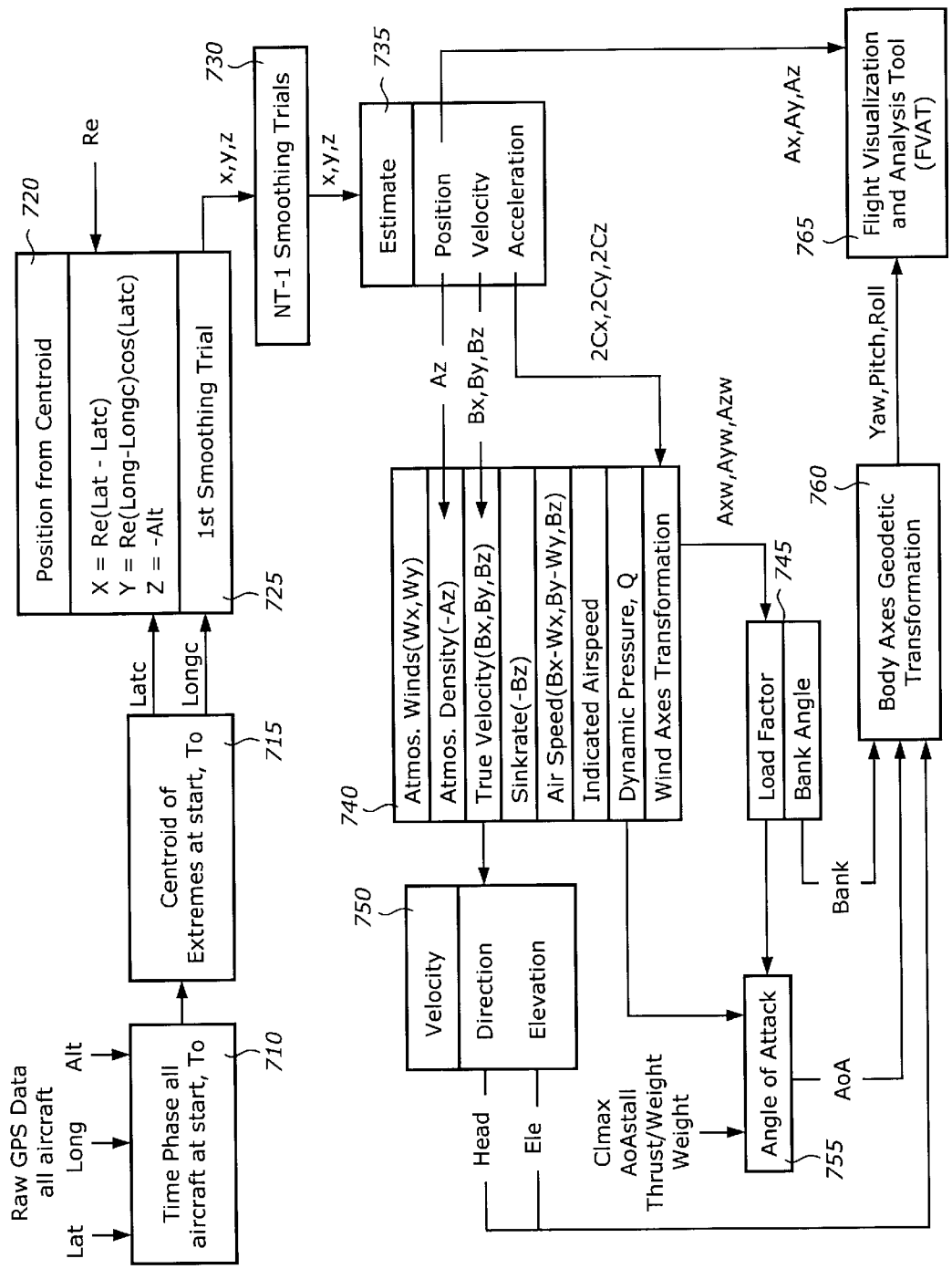
FIG. 7 is a diagram illustrating the computation of the flight dynamic parameters using the smoothed position data according to one embodiment of the invention.

FIG. 7 is a diagram illustrating the computation of the flight dynamic parameters using the smoothed position data.

At the beginning, the raw GPS data including the latitute (Lat), longitude (Long), and altitude (Alt) are received. These data are then time-phased for all aircraft to synchronize all the data with respect to a common starting time, T0, (Block 710). It is assumed that there are multiple aircraft in the scenario. Then the centroid of these data are compute to provide a point with which all positions data are referenced (Block 720). The results are the centroid latitude (Latc) and centroid longitude (Longc).

The xyz position data are then computed with respect to the centroid (Block 720). Then the first smoothing trial is applied to the xyz position data (Block 725) to produce the smoothed xyz data. Additional smoothing trials are performed if necessary (Block 730). The result of the smoothing is the smoothed position data (x,y,z). From the equations (2), (3), and (4), velocity (Bx, By, Bz) and acceleration (2Cx, 2Cy, 2Cz) are determined (Block 735).

The atmospheric wind data (Wx, Wy) are received to compute the air speed, and for wind axes transformation. The atmospheric density is determined according to the Az value. The true velocity is essentially the same as the computed velocity (Bx, By, Bz). The sink rate is −Bz. The airspeed is (Bx−Wx, By−Wy, Bz). The indicated airspeed is obtained from the altitude (−Az) and a standard atmosphere model of air density. The dynamic pressure Q is also obtained (Block 740). The xyz position data are transformed based on the wind axes to provide the transformed acceleration data (Axw, Ayw, Azw) which are used to generate the load factor and the bank angle (Block 745).

The flight data in block 740 are used to determine direction and elevation components of velocity to provide heading and elevation (Block 750). The thrust and weight information are used together with the dynamic pressure and load factor to generate the angle of attack (AoA) (Block 755). The bank, angle of attack, heading, and elevation are used in a body axes geodetic transformation to generate the yaw, pitch, and roll (herein referred to as aircraft attitude) (Block 760). Then, the position data Ax, Ay, Az and the yaw, pitch, and roll are used in Flight Visualization and Analysis Tool (FVAT) for displaying on a display unit (Block 765).

There are a number of applications that can utilize the technique in the present invention. The flight data processing system as shown in FIG. 2B can be used in commercial small aircraft such as private aircraft or jet. These small aircraft are not equipped with expensive flight data recorders as used in larger commercial jet liners. These small aircraft, however, can be equipped with less expensive GPS receiver to receive GPS data. The flight data processing system acts as a "black box" that can provide valuable reconstructed flight parameters after an aircraft crash.

Thus, the present invention is a technique to smooth GPS raw data to determine the aircraft flight position and dynamic parameters. The technique provides an accurate estimate of the position and dynamic parameters of the aircraft in flight.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   converting data received from a global positioning system (GPS) receiver to position data; and
   filtering the position data based on a least-squares fitting to generate smoothed position data, the filtering comprising:
      interpolating the position data to provide interpolated data, and
      smoothing the position and the interpolated data to provide the smoothed position data.

2. The method of claim 1 further comprising
   converting the smoothed position data to flight parameters of an aircraft.

3. The method of claim 2 wherein the flight parameters include at least one of yaw, pitch, and roll angles.

4. The method of claim 2 wherein the flight parameters include at least one of velocity and acceleration.

5. The method of claim 1 wherein smoothing comprises:
   smoothing the position and interpolated data in a first time interval window to produce a first smoothed data set; and
   smoothing the first smoothed data set in a second time interval window to produce a second smoothed data set, the second data set corresponding to the smoothed position data.

6. The method of claim 5 wherein the first and second time interval windows have same length.

7. The method of claim 6 wherein the second time interval window is shifted in time with respect to the first time interval window by a shift amount.

8. The method of claim 1 wherein interpolating comprises:
   interpolating the position data using a linear interpolation.

9. The method of claim 1 wherein the least-squares fitting is a second order curve fitting.

10. A computer program product comprising:
    a computer usable medium having computer program code embodied therein to determine flight parameters of an aircraft, the computer program product having:
    (a) computer readable program code for converting data received from a global positioning system (GPS) receiver to position data; and
    (b) computer readable program code for filtering the position data based on a least-squares fitting to generate smoothed position data, comprising:
       (b1) computer readable program code for interpolating the position data to provide interpolated data, and
       (b2) computer readable program code for smoothing the position and the interpolated data to provide the smoothed position data.

11. The computer program product of claim 10 further comprising
    (a) computer readable program code for converting the smoothed position data to the flight parameters of an aircraft.

12. The computer program product of claim 11 wherein the flight parameters include at least one of yaw, pitch, and roll angles.

13. The program product of claim 11 wherein the flight parameters include at least one of velocity and acceleration.

14. The computer program product of claim 11 wherein the computer readable program code for smoothing comprises:
    (b21) computer readable program code for smoothing the position and interpolated data in a first time interval window to produce a first smoothed data set; and
    (b22) computer readable program code for smoothing the first data set in a second time interval window to produce a second smoothed data set, the second data set corresponding to the smoothed position data.

15. The computer program product of claim 14 wherein the first and second time interval windows have same length.

16. The computer program product of claim 15 wherein the second time interval window is shifted in time with respect to the first time interval window by a shift amount.

17. The computer program product of claim 10 wherein the computer readable program code for interpolating comprises:

(b11) computer readable program code for interpolating the position data using a linear interpolation.

18. The computer program product of claim 10 wherein the least-squares fitting is a second order curve fitting.

19. A system comprising:
a global positioning system (GPS) data recording unit to record GPS data corresponding to position of an aircraft;
a processor coupled to the GPS data recording unit to determine flight parameters of the aircraft; and
a memory coupled to the processor to store instructions executable by the processor, the instructions when executed by the processing unit causing the processor to:
convert data received from a global positioning system (GPS) receiver to position data, and
filter the position data based on a least-squares fitting to generate smoothed position data, the instructions causing the processor to filter the position data causes the processor to:
interpolate the position data to provide interpolated data, and
smooth the position and the interpolated data to provide the smoothed position data.

20. The system of claim 19 wherein the memory further comprising instructions, when executed by the processor, causing the processor to:
convert the smoothed position data to the flight parameters.

21. The system of claim 20 wherein the flight parameters include at least one of yaw, pitch, and roll angles.

22. The system of claim 20 wherein the flight parameters include at least one of velocity and acceleration.

23. The system of claim 19 wherein the instructions, when executed, causing the processor to smooth the position and the interpolated data causes the processor to:
smooth the position and interpolated data in a first time interval window to produce a first smoothed data set; and
smooth the first data set in a second time interval window to produce a second smoothed data set, the second data set corresponding to the smoothed position data.

24. The system of claim 23 wherein the first and second time interval windows have same length.

25. The system of claim 24 wherein the second time interval window is shifted in time with respect to the first time interval window by a shift amount.

26. The system of claim 19 wherein the processor interpolates the position data using a linear interpolation.

27. The system of claim 19 wherein the least-squares fitting is a second order curve fitting.

28. A method comprising:
filtering position data of an aircraft based on least-squares fitting to generate smoothed position data, the position data being provided by a GPS receiver, the filtering comprising:
interpolating the position data to provide interpolated data, and
smoothing the position and the interpolated data to provide the smoothed position data; and
determining attitude of the aircraft using the smoothed position data.

29. The method of claim 28 wherein determining attitude comprises:
performing a body axes geodetic transformation to generate the attitude.

30. The method of claim 29 wherein performing the body axes geodetic transformation comprises:
transforming at least one of bank angle, angle of attack, headings and elevation to at least one of yaw, pitch and roll.

31. The method of claim 30 wherein transforming comprises:
generating the angle of attack using at least one of thrust, weight, dynamic pressure, and load factor; and
generating the heading and the elevation using velocity direction and velocity elevation.

32. The method of claim 31 wherein transforming further comprises:
generating the load factor and the bank angle using transformed acceleration data.

33. The method of claim 32 wherein generating the load factor and the bank angle comprises:
transforming the smoothed position data based on wind axes to provide the transformed acceleration data.

34. The method of claim 31 wherein generating the heading and the elevation comprises:
determining the velocity direction and the velocity elevation using atmospheric and velocity information.

35. The method of claim 34 wherein the atmospheric and velocity information include at least one of atmospheric wind data, atmospheric density, true velocity, sink rate, airspeed, and indicated airspeed.

* * * * *